(12) United States Patent
Jiang et al.

(10) Patent No.: US 11,829,296 B2
(45) Date of Patent: Nov. 28, 2023

(54) CACHE MANAGEMENT BASED ON COMPRESSION RATES OF DATA

(71) Applicant: Dell Products L.P., Round Rock, TX (US)

(72) Inventors: Changxu Jiang, Chengdu (CN); Fei Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/828,484

(22) Filed: May 31, 2022

(65) Prior Publication Data

US 2023/0126970 A1    Apr. 27, 2023

(30) Foreign Application Priority Data

Oct. 21, 2021    (CN) .......................... 202111228188.1

(51) Int. Cl.
*G06F 12/08* (2016.01)
*G06F 12/0891* (2016.01)

(52) U.S. Cl.
CPC ...... *G06F 12/0891* (2013.01); *G06F 2212/60* (2013.01); *G06F 2212/7205* (2013.01)

(58) Field of Classification Search
None
See application file for complete search history.

(56) References Cited

U.S. PATENT DOCUMENTS

| 9,189,402 | B1 | 11/2015 | Smaldone et al. |
| 9,304,914 | B1 | 4/2016 | Douglis et al. |
| 9,390,116 | B1 | 7/2016 | Li et al. |
| 2005/0268044 | A1* | 12/2005 | Arcas ................ G06F 12/127 711/170 |
| 2007/0226320 | A1* | 9/2007 | Hager ................ G06F 16/182 709/219 |
| 2019/0324916 | A1* | 10/2019 | Armangau .......... G06F 12/0868 |
| 2020/0019329 | A1* | 1/2020 | Faibish ............... G06F 12/0804 |
| 2021/0191658 | A1* | 6/2021 | Mizushima .......... G06F 3/0688 |
| 2021/0224198 | A1 | 7/2021 | Gahlot et al. |
| 2021/0286730 | A1 | 9/2021 | Lv et al. |
| 2023/0136522 | A1* | 5/2023 | Jain ........................ G06F 11/30 711/154 |

* cited by examiner

*Primary Examiner* — Tracy C Chan
(74) *Attorney, Agent, or Firm* — BainwoodHuang (57) ABSTRACT

Techniques for cache management involve: determining respective elimination scores of a plurality of entries in a cache based at least in part on compression rates of data blocks corresponding to the plurality of entries, the elimination score being proportional to the compression rate; and removing, from the cache, at least one entry with a relatively low elimination score among the plurality of entries. Such techniques are able to optimize the retention and elimination strategies for entries in a cache, thus increasing payoffs for using the cache.

11 Claims, 5 Drawing Sheets

FIG. 5

CACHE MANAGEMENT BASED ON COMPRESSION RATES OF DATA

CROSS-REFERENCE TO RELATED APPLICATION

This application claims priority to Chinese Patent Application No. CN202111228188.1, on file at the China National Intellectual Property Administration (CNIPA), having a filing date of Oct. 21, 2021, and having "METHOD, SYSTEM AND COMPUTER PROGRAM PRODUCT FOR CACHE MANAGEMENT" as a title, the contents and teachings of which are herein incorporated by reference in their entirety.

TECHNICAL FIELD

Embodiments of the present disclosure relate to storage technology, and more particularly, to a method, a system, and a computer program product for cache management.

BACKGROUND

A cache is an important part of a modern storage system, which is very important to the performance of the storage system. One aspect of cache management is to retain as much cached data that can bring the greatest payoff as possible in the cache, while removing cached data with a relatively low payoff. A conventional method for cache management usually decides which entries to remove or retain in the cache based on a last time when the cached data was accessed, a hit ratio, and so on. However, the conventional method may not achieve optimized results in some scenarios. For example, in scenarios such as reducing stored data, the cache retained according to the conventional method may not be optimized for achieving transaction goals.

SUMMARY

Embodiments of the present disclosure provide a solution for cache management.

In a first aspect of the present disclosure, a method for cache management is provided. This method includes: determining respective elimination scores of a plurality of entries in a cache based at least in part on compression rates of data blocks corresponding to the plurality of entries, the elimination score being proportional to the compression rate; and removing, from the cache, at least one entry with a relatively low elimination score among the plurality of entries.

In a second aspect of the present disclosure, an electronic device is provided. The device includes a processor and a memory coupled to the processor, the memory having instructions stored therein, and the instructions, when executed by the processor, causing the device to perform actions including: determining respective elimination scores of a plurality of entries in a cache based at least in part on compression rates of data blocks corresponding to the plurality of entries, the elimination score being proportional to the compression rate; and removing, from the cache, at least one entry with a relatively low elimination score among the plurality of entries.

In a third aspect of the present disclosure, a computer program product is provided. The computer program product is tangibly stored on a computer-readable medium and includes machine-executable instructions. When executed, the machine-executable instructions cause a machine to perform the method according to the first aspect of the present disclosure.

Note that this Summary part is provided to introduce the selection of concepts in a simplified form, which will be further described in the Detailed Description below. The Summary part is neither intended to identify key features or major features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, wherein.

In all the accompanying drawings, identical or similar reference numerals represent identical or similar elements.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The following will describe the embodiments of the present disclosure in more detail with reference to the accompanying drawings. Although the drawings show certain embodiments of the present disclosure, it should be understood that the present disclosure can be implemented in various forms and should not be limited by the embodiments described herein. Instead, these embodiments are provided to enable a more thorough and complete understanding of the present disclosure. It should be understood that the accompanying drawings and embodiments of the present disclosure are by way of example only, and are not intended to limit the protection scope of the present disclosure.

The term "cache" as used herein refers to a high-speed temporary data storage area in a computing system, which may be implemented in both hardware and software. A cache typically stores the most frequently executed programs and data in it so that they can be accessed quickly when requested. For example, a cache may store programs and data needed by a processor (e.g., a CPU) for its current operation (such as an operation of writing data to a storage).

The term "entry" as used herein refers to a data record that corresponds to specific data in some way (such as containing an identifier that may identify copies of the same data block).

The term "data block" as used herein refers broadly to a certain unit of data that may be read, written, processed, transmitted, or stored. For example, a data block may be a unit of data that is split into when data is written to a storage.

The term "compression rate" as used herein refers to a ratio of the size of data after compression to its size before compression, wherein the lower the compression rate is, the higher the degree to which the data is compressed is. For example, in a virtualized storage environment where a data block is compressed and stored either via a virtual redirection layer or directly at a storage location at a physical layer, the compression rate of the data block may be a ratio of the original size of the data block to the physical size of the data block stored at the storage location.

The term "cache hit ratio" as used herein is a ratio of the number of times a requested target (e.g., a particular entry) exists in a cache when the cache is requested to the number of times the target is requested, wherein the higher the hit ratio is, the higher the payoff for caching the target is.

The "last access time" of data mentioned herein refers to the time when the data was last accessed, for example, the time when a certain entry in the cache was accessed most recently.

The term "deduplication" as used herein is short for the term "data deduplication." Data deduplication refers to a technology which reduces identical data blocks stored in physical space to only a single copy of the data block to save storage space. The term "online deduplication" refers to deduplication performed on data while it is being written to a storage. For example, for flash memory arrays, online deduplication reduces the amount of data written to a physical drive and reduces wear and tear on a storage medium (such as a flash in a solid-state drive (SSD)), thereby extending the life of the drive.

A common method for online deduplication is to divide data into data blocks and assign a unique identifier to each data block. When a data block is to be written, the identifier of the data block may be checked to see if a copy thereof already exists in the storage. If yes, a new copy of the data block will not be written. However, as online deduplication occurs during data transfer to the storage, it is difficult to perform deduplication on all incoming data blocks. Typically, a group of entries may be stored in the cache, each of which corresponds to a data block, indicating that a copy of the data block should be deduplicated when being written to the storage.

The term "meet a threshold" as used herein refers to being less than the threshold, less than or equal to the threshold, equal to the threshold, greater than or equal to the threshold, or greater than the threshold. The term "meet a certain percentage" refers to being less than the certain percentage, less than or equal to the certain percentage, equal to the certain percentage, greater than or equal to the certain percentage, or greater than the certain percentage.

The term "include" and variations thereof as used herein mean open-ended inclusion, that is, "including but not limited to." The term "based on" is "based at least in part on." The term "one embodiment" means "at least one embodiment." The term "another embodiment" means "at least one further embodiment." Relevant definitions of other terms will be given in the description below.

Caches that are filtered by conventional cache management technologies are not always optimized. For example, in a cache for online deduplication in combination with compression techniques, even for two groups of cache entries with the same hit ratio and last access time, as the compression rates of data blocks corresponding to these entries are different, the payoffs for using the two groups of cache entries for deduplication may also be quite different, and conventional technologies cannot pick out entries with higher payoffs among them.

To address at least some of the problems described above and other potential problems, the embodiments of the present disclosure propose a solution for performing cache management using a compression rate of a data block corresponding to an entry in a cache. The solution determines an elimination score of each of a plurality of entries in a cache, and removes from the cache an entry with a relatively low elimination score among the plurality of entries, wherein the elimination score of each entry is proportional to the compression rate of a data block corresponding to the entry. Compared with conventional technologies, cache management using the solution of the present disclosure optimizes the retention and elimination strategies for entries in the cache, thus further increasing the payoffs for using the cache.

Figure 1:
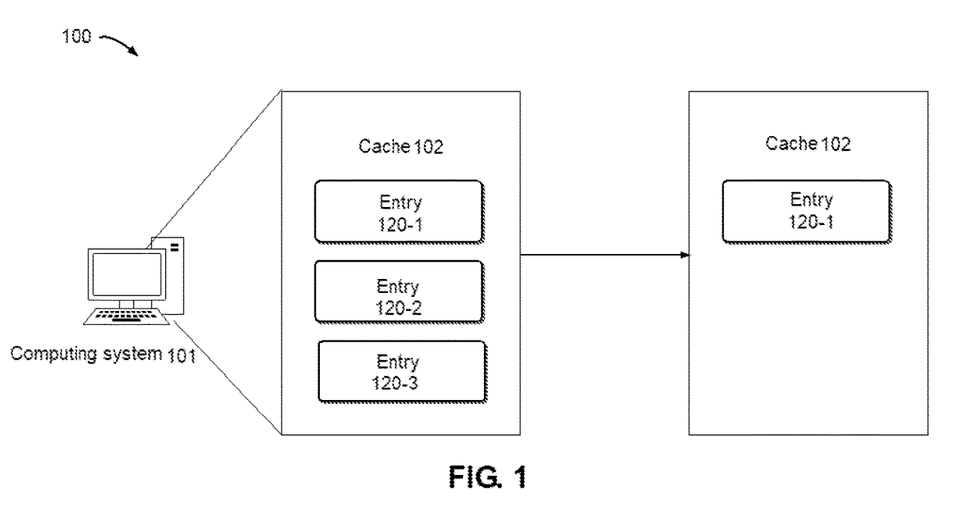
FIG. 1 illustrates a schematic diagram of an example environment in which a device and/or a method according to embodiments of the present disclosure can be implemented.

FIG. 1 shows example environment 100 in which a device and/or a method according to embodiments of the present disclosure may be implemented. As shown, example environment 100 includes example computing system 101, which may be a single computing system or a distributed or cloud-based system. Computing system 101 has cache 102, in which multiple entries 120-1, 120-2, and 120-3 (or collectively referred to as entry 120) are stored.

After computing system 101 performs cache management, some of entries 120 (i.e., entry 120-2 and entry 120-3) are removed from cache 102. It should be understood that the number of entries 120 shown in FIG. 1 is an example only. It should also be understood that in addition to removing data from the cache, cache management may also include other operations such as defragmentation of the cache.

Figure 2:
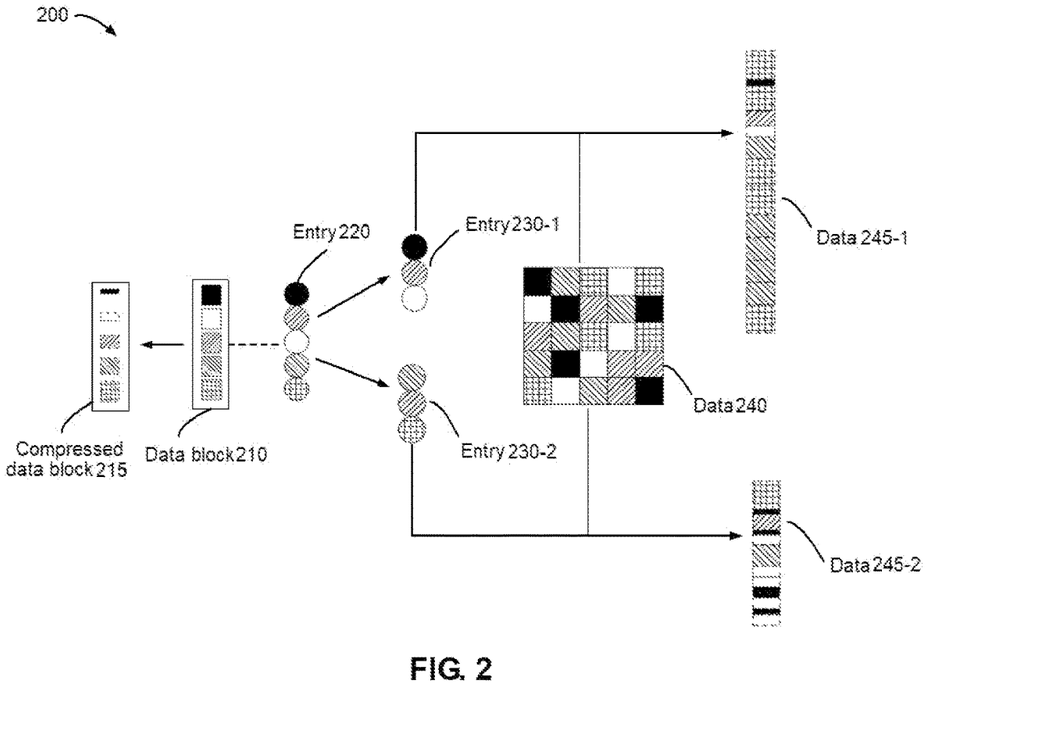
FIG. 2 illustrates an example scenario in which a conventional solution is used to perform cache management.

FIG. 2 shows example scenario 200 in which a conventional solution is used to perform cache management. For illustrative purposes, example scenario 200 is described below in the context of data deduplication and compression.

In example scenario 200, the data block is deduplicated and compressed using multiple entries 220 in the cache to save storage space. Each entry of entries 220 corresponds to a data block in the data.

When a new data block is to be written to the storage, it will be determined whether there is an entry that corresponds to the data block in entries 220. For example, a hash value of the data block may be compared with a hash value contained in an entry of entries 220. If there is an entry that contains the same hash value as that of the data block, a copy of the data block will not be written to the storage. A copy of a data block that needs to be written is compressed and written to the storage.

The strategies for deciding which entries to eliminate or retain in the cache have a significant impact on the performance of the cache. For example, retaining different entries of entries 220 has a significant impact on the hit ratio of deduplication using entries 220 and the size of storage space that can be saved as a result. Conventional technologies typically take into account the type of data workload to, for example, classify data blocks corresponding to entries based on the level of deduplicability and decide which entries to eliminate based on the classification.

However, the conventional retention and elimination strategies are not optimized. As an example, FIG. 2 shows data block 210 corresponding to an entry of entries 200 and compressed data block 215 that can be obtained after the compression of data block 210. As shown, these data blocks have different compression rates. For the sake of simplicity, assuming that except for the compression rate, other properties such as the size of the data blocks are the same, and properties such as the hit ratio of the entries corresponding to these data blocks are also the same, then removing an entry in entries 220 using a method that does not take compression rate into account may obtain a variety of different results, such as entries 230-1 or entries 230-2. Entries 230-1 or entries 230-2 have the same number of entries, but the data blocks corresponding to these entries have different compression rates.

In example scenario 200, deduplication needs to be performed on data 240. For the sake of simplicity only, data blocks of data 240 are shown as appearing the same number of times. Then, entries 230-1 are used to deduplicate and compress data 240 to obtain data 245-1 that should be written to the storage, while entries 230-2 are used to deduplicate and compress data 240 to obtain data 245-2 that should be written to the storage. Data 245-1 and data 245-2 require significantly different storage space.

It should be understood that the number of data blocks and entries that appear in example scenario 200 is only an example, and in practice, any appropriate number of data blocks and entries may exist.

Figure 3:
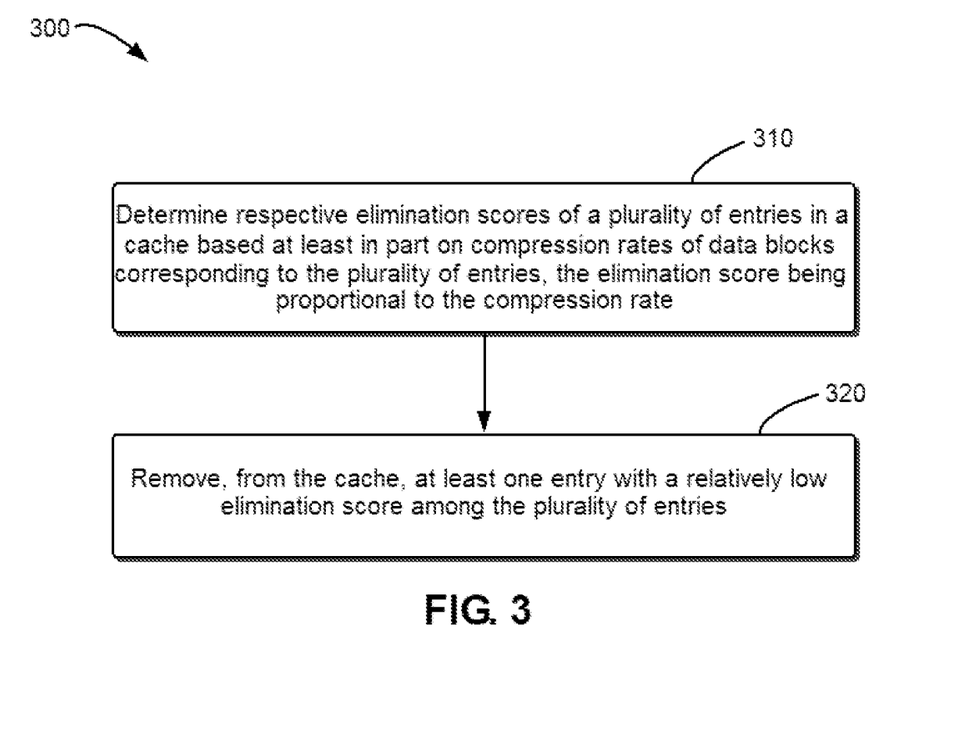
FIG. 3 illustrates a flow chart of a cache management method according to some embodiments of the present disclosure.

FIG. 3 shows a flow chart of example method 300 for managing a cache using a compression rate according to some embodiments of the present disclosure. Example method 300 may, for example, be performed by example system 101 (e.g., a processor of system 101). Example method 300 is described below with reference to FIG. 1.

At block 310, system 101 determines respective elimination scores of a plurality of entries 120 in cache 102 based at least in part on compression rates of data blocks corresponding to the plurality of entries 120, and the elimination score is proportional to the compression rate of the corresponding data block. Entry 120 may correspond to a data block in any appropriate way. For example, system 101 may store a hash value of a data block in entry 120 corresponding to the data block. For example, system 101 may also store, in entry 120, a signature, a fingerprint, or other types of identifiers that are otherwise determined for the corresponding data block.

In some embodiments, system 101 may use the compression rate of the corresponding data block as the elimination score of entry 120. In some other embodiments, system 101 may classify different compression rates into multiple levels with different values, and use a value of a compression rate level for the corresponding data block as the elimination score of entry 120.

In some embodiments, system 101 may also determine the elimination score of entry 120 based on at least one additional feature other than the compression rate. In some embodiments, the additional features may include at least one of the cache hit ratio and last access time of entry 120. For example, system 101 may use at least one of the hit ratio count of entry 120 and its ranking in the least recently used (LRU) list together with the compression rate of the corresponding data block to determine the elimination score of the entry 120.

In some embodiments, system 101 may determine the elimination score of entry 120 as a value according to the fact that the compression rate of the data block corresponding to entry 120 and the at least one additional feature each satisfy a corresponding condition. For example, the condition may be that its value meets a threshold. For example, the condition may be that the ranking of its value among values of the same type for all entries 120 meets a certain percentage. Other suitable conditions may also be used.

In some embodiments, system 101 may determine the elimination score of entry 120 by combining at least one additional feature of entry 120 with the compression rate of the corresponding data block. For example, system 101 may multiply a cache hit ratio of entry 120 by the compression rate (or the value of the compression rate level) of the corresponding data block as the elimination score of the entry 120.

At block 320, system 101 removes, from the cache, at least one entry 120 with a relatively low elimination score in the plurality of entries 120. In some embodiments, system 101 may remove, from the cache, entry 120 whose elimination score is below the threshold. In some other embodiments, system 101 may remove, from the cache, a certain number or percentage of entries 120 that have the lowest elimination scores among all entries in entry 120.

System 101 may use example method 300 alone, multiple times, and iteratively in cache management. The specific determination mode of the elimination score and the specific determination mode of the number of entries 120 to be removed from the cache may differ each time system 101 uses example method 300. For example, in one stage, system 101 may, as described above, assign values to the elimination scores of entries 120 and remove a group of entries 120 with the lowest elimination scores according to the fact that the additional features of entries 120 and the compression rates of the corresponding data blocks each satisfy a corresponding condition. In another stage, system 101 may, as described above, determine the elimination scores of entries 120 by combining the additional feature values of entries 120 with the compression rates of the corresponding data blocks, and remove one percentage of entries 120 with the lowest elimination scores. The stages described above are only examples, and system 101 may perform example method 300 in more or fewer stages. In addition, system 101 may use example method 300 in combination with other cache management methods. For example, system 101 may select a part of candidate entries 120 from entries 120 and perform example method 300 on the part of candidate entries 120. As a result, system 101 may manage cache 102 in a finer granularity. Also, system 101 may use methods of different complexity to determine the elimination scores of entries 120 by using compression rates, and perform more complex calculations for only a part of entries 120, thus reducing computational complexity.

Compared with conventional technologies, example method 300 takes into account the compression rate of the data block corresponding to the entry in the cache in cache management to thus optimize the retention and elimination strategies for entries in the cache, for example, when the compression rate of the data block corresponding to the entry has affected the efficiency and effectiveness of transactions using the entry. For example, in example scenario 200, compared with multiple results of entries 230-1 and entries 230-2 that can be obtained by using conventional technologies, the cache management of the embodiments of the present disclosure may further pick out entries 230-2 that can save more storage space among them.

To further illustrate the advantages of example method 300, Table 1 shows the results of an example simulation which uses example method 300 for cache management in a data storage scenario. The example simulation may, for example, be performed by system 101 and is described below with reference to FIG. 1.

TABLE 1

Example simulation results in a data storage scenario

| K:HWM | Reduction Rate of Physical Space Consumption | Details |
|---|---|---|
| 10:100 | 11.91% | Logical space required: 1024.0 GB |
| | | Compressed space: 432.40 GB |
| | | Physical space (original): 208.58 GB |
| | | Physical space (optimized): 183.71 GB |
| 15:100 | 13.48% | Logical space required: 1024.0 GB |
| | | Compressed space: 411.23 GB |
| | | Physical space (original): 209.16 GB |
| | | Physical space (optimized): 180.95 GB |
| 20:100 | 13.29% | Logical space required: 1024.0 GB |
| | | Compressed space: 401.25 GB |
| | | Physical space (original): 206.29 GB |
| | | Physical space (optimized): 178.85 GB |
| 25:100 | 15.68% | Logical space required: 1024.0 GB |
| | | Compressed space: 410.56 GB |
| | | Physical space (original): 202.73 GB |
| | | Physical space (optimized): 171.89 GB |
| 30:100 | 16.33% | Logical space required: 1024.0 GB |
| | | Compressed space: 444.20 GB |
| | | Physical space (original): 212.39 GB |
| | | Physical space (optimized): 177.70 GB |
| 35:100 | 19.03% | Logical space required: 1024.0 GB |
| | | Compressed space: 388.19 GB |
| | | Physical space (original): 202.06 GB |
| | | Physical space (optimized): 163.59 GB |
| 40:100 | 18.64% | Logical space required: 1024.0 GB |
| | | Compressed space: 392.64 GB |
| | | Physical space (original): 198.33 GB |
| | | Physical space (optimized): 161.36 GB |

In the example simulation, system 101 uses method 300 to eliminate entries 120 in cache 102 that are used for online deduplication. To prepare a data source for the simulation, system 101 generates a copy of a data block from a set F of data blocks, wherein each element in F is a different data block of the same size, and the compression rate Cn of each element is randomly selected from a set C. System 101 also stores, in a hash table H in cache 102, hash values of multiple data blocks in F as multiple entries 120. The deduplicability weight Wn of each entry 120 in H is initialized to 1 and increases with the increase of the cache hit ratio of entry 120. The weight Wn reflects the deduplicability level of the entry.

During the simulation, for each generated copy of an incoming data block, system 101 queries whether a hash value of the data block matches entry 120 in H. If there is no matching entry 120, the copy of the data block is stored; otherwise, simply a reference count needs to be added for the previously stored copy of the data block. In this example, the maximum deduplication reference count for the same storage data block is limited to N. Every once in a while, system 101 generates new entry 120 and adds it to the hash table H in the cache. If the size of H reaches the threshold HWM, the elimination iteration is triggered.

In this simulation example, system 101 performs example method 300 in two stages of multiple iterations. In each iteration, the system first ranks the deduplicability weights Wn of entries 120 in the hash table H, and selects K entries 120 with the lowest ranking as candidate entries. Then, in the first stage, system 101 determines an elimination score of a candidate entry with $Wn \leq Wm$ and $Cn \leq Cm$ for the corresponding data block as being low, determines an elimination score of a candidate entry with $Wn \leq Wm$ and $Cn > Cm$ for the corresponding data block as being medium, and determines an elimination score of other candidate entries as being high, wherein Wm is the median of the Wn values of all candidate entries. System 101 then removes entry 120 with a low elimination score from the hash table H. In the second stage, system 101 calculates Wn*Cn of the remaining candidate entries as their elimination scores, and removes from the cache α percentage of entries 120 with relatively low elimination scores when the size of the hash table H reaches HWM again.

Table 1 shows the results of running the above simulation with the following parameter values. It should be understood that the specific operations and specific values mentioned in the description of the example simulation are only examples and should not be considered restrictive in any way:

F={f1,f2, . . . , f200}, where each fn is a different 8 KB data block;
C={[1:1],[1:2],[1:4],[1:8],[1:16]};
N=256;
Cm=0.5; and
α=50%.

System 101 also performs a simulation that applies to the same scenario an original method as a contrast. The original method only includes: in each elimination iteration as previously described, only the deduplicability weights Wn of entries 120 in the hash table H are ranked, and K entries 120 with the lowest ranking are removed from H. The simulation results of the original method are also shown in Table 1.

As shown in Table 1, in the example simulation of writing 1 TB TO, using the optimized method of example method 300 helps greatly improve the deduplication efficiency by reducing physical space consumption by approximately 15% compared with the original method. In Table 1:

Reduction rate of physical space consumption =
$$100\% * \frac{\text{Physical space consumption difference}}{\text{Physical space required by original algorithm}}$$

where the physical space consumption difference is the difference of the physical space consumption for writing data using the original method minus the physical space consumption for writing data using the optimized method of example method 300 in this simulation example.

Figure 4:
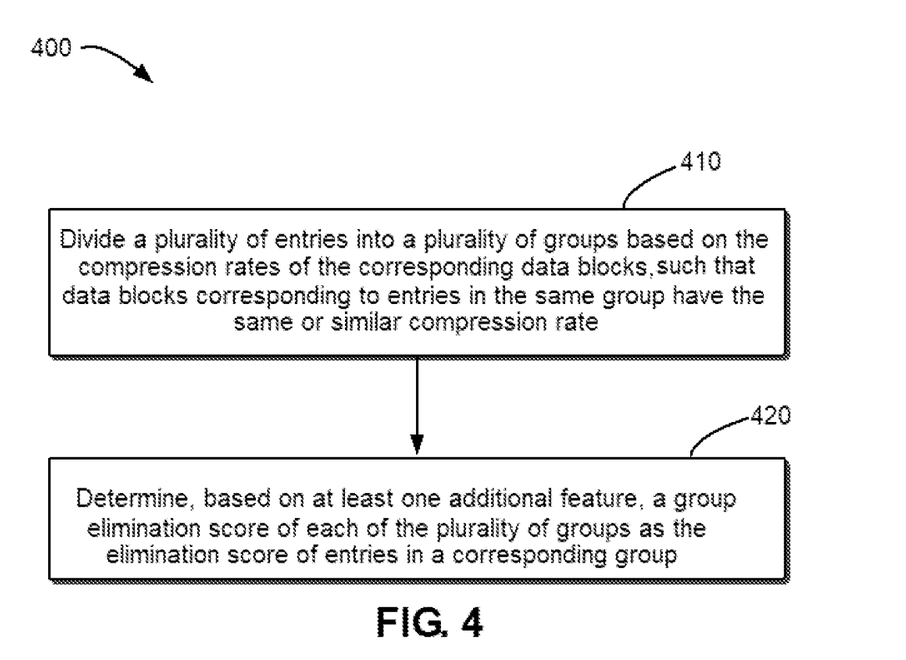
FIG. 4 illustrates a flow chart of an example method for determining an elimination score according to some embodiments of the present disclosure.

FIG. 4 shows a flow chart of example method 400 for determining an elimination score according to some embodiments of the present disclosure. Example method 400 may be regarded as an example implementation of block 310 in example method 300. Example method 400 may, for example, be performed by example system 101 (e.g., a processor of system 101). Example method 400 is described below with reference to FIG. 1.

At block 410, system 101 may divide a plurality of entries 120 into a plurality of groups based on the compression rate of a corresponding data block, such that data blocks corresponding to entries 120 in the same group have the same or similar compression rate. In some embodiments, it is possible to classify the compression rates into multiple levels and put entries 120 with the same level of compression rate for the corresponding data block in the same group. In some embodiments, system 101 may use multiple groups of entries 120, each of which corresponds to a level of compression rate, and when a new entry 120 is added to the cache, system 101 may add the entry 120 to the group corresponding to the compression rate level of the corresponding data block.

At block 420, system 101 may determine, based on at least one additional feature, a group elimination score of each of the plurality of groups as the elimination score of entries 120 in a corresponding group. In some embodiments, the additional features may include at least one of the cache hit ratio and last access time of entry 120 in the group. For example, system 101 may determine the weight of a group based on at least one of the cache hit ratio and last access time of entry 120 in the group, which may be used as the group elimination score of the group, or used together with the compression rate of the data block corresponding to the group to determine the group elimination score.

In some embodiments, system 101 may determine the group elimination score of the group as a value according to the fact that the compression rate of the data block corresponding to the group and the weight of the group each satisfy a corresponding condition. For example, the condition may be that its value meets a threshold. For example, the condition may be that the ranking of its value among values of the same type for all groups meets a certain percentage. Other suitable conditions may also be used.

In some embodiments, system 101 may determine the group elimination score for the group by combining the weight of the group with the compression rate of the data block corresponding the group. For example, system 101 may multiply the weight of the group by the level value of the compression rate of the data block corresponding to the group as the group elimination score of the group.

In some embodiments, system 101 may remove from the cache at least a part of entries 120 with relatively low group elimination scores in one or more groups of entries 120. In some embodiments, system 101 may remove groups whose group elimination scores are below the threshold. In some embodiments, system 101 may remove a certain number or percentage of groups with the lowest group elimination score among all groups.

In some embodiments, system 101 may remove one or more entries 120 from the group with the lowest elimination score. For example, system 101 may remove one or more entries in the group based on one or more additional features of entries 120 in the group. In some embodiments, the additional features may be at least one of the cache hit ratio and last access time. For example, each group may be an LRU list, and system 101 may remove from the cache one or more entries in the group with the lowest group elimination score based on at least one of the LRU ranking and the cache hit ratio of entry 120 in the LRU.

In the embodiments described above with reference to FIGS. 3 and 4, the compression rate of the data block corresponding to entry 120 is positively correlated with the elimination score of entry 120. It should be understood that in some other embodiments, when the elimination of entry 120 with a relatively high compression rate of a corresponding data block is beneficial to the goal of using entry 120, the compression rate of the data block corresponding to entry 120 may also be inversely correlated with the elimination score of entry 120.

Figure 5:
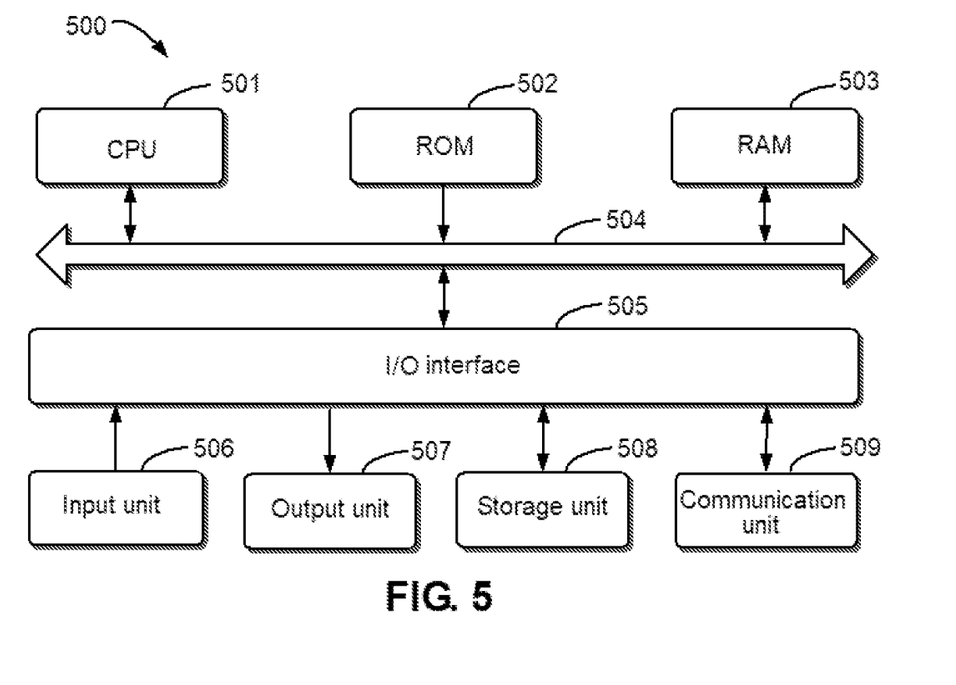
FIG. 5 illustrates a schematic block diagram of a device that may be configured to implement the embodiments of the present disclosure.

FIG. 5 shows a schematic block diagram of device 500 that may be configured to implement embodiments of the present disclosure. Device 500 may be the device or apparatus described in the embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504. Although not shown in FIG. 5, device 500 may also include a coprocessor.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various methods or processes described above may be performed by processing unit 501. For example, in some embodiments, the method may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded into RAM 503 and executed by CPU 501, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in the reverse order, depending on the functions involved. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various embodiments of the present disclosure have been described above. The foregoing description is illustrative rather than exhaustive, and is not limited to the disclosed various embodiments. Numerous modifications and alterations are apparent to those of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A method for cache management, comprising:
   determining respective elimination scores of a plurality of entries in a cache based at least in part on compression rates of data blocks corresponding to the plurality of entries, wherein lower compression rates indicate higher degrees of data compression, the elimination score being proportional to the compression rate; and
   removing, from the cache, at least one entry with a relatively low elimination score among the plurality of entries.

2. The method according to claim 1, wherein the elimination score is also determined based on at least one additional feature of a corresponding entry which is other than the compression rate.

3. The method according to claim 2, wherein the additional feature comprises one or more of the following:
   cache hit ratio; and
   last access time.

4. The method according to claim 2, wherein determining respective elimination scores of the plurality of entries comprises:
   dividing the plurality of entries into a plurality of groups based on the compression rates of the corresponding data blocks, such that data blocks corresponding to entries in the same group have the same or similar compression rate; and determining, based on the at least one additional feature, a group elimination score of each of the plurality of groups as the elimination score of entries in a corresponding group.

5. The method according to claim 4, wherein the removing comprises:
removing, from the cache, at least some entries in one or more groups of entries with a relatively low group elimination score.

6. An electronic device, comprising:
a processor; and
a memory coupled to the processor, the memory having instructions stored therein, and the instructions, when executed by the processor, causing the device to perform actions comprising:
determining respective elimination scores of a plurality of entries in a cache based at least in part on compression rates of data blocks corresponding to the plurality of entries, wherein lower compression rates indicate higher degrees of data compression, the elimination score being proportional to the compression rate; and
removing, from the cache, at least one entry with a relatively low elimination score in the plurality of entries.

7. The device according to claim 6, wherein the elimination score is also determined based on at least one additional feature of a corresponding entry which is other than the compression rate.

8. The device according to claim 7, wherein the additional feature comprises one or more of the following:
cache hit ratio; and
last access time.

9. The device according to claim 7, wherein determining respective elimination scores of the plurality of entries comprises:
dividing the plurality of entries into a plurality of groups based on the compression rates of the corresponding data blocks, such that data blocks corresponding to entries in the same group have the same or similar compression rate;
determining, based on the at least one additional feature, a group elimination score of each of the plurality of groups as the elimination score of entries in a corresponding group.

10. The device according to claim 9, wherein the removing comprises:
removing, from the cache, at least some entries in one or more groups of entries with a relatively low group elimination score.

11. A computer program product having a non-transitory computer readable medium which stores a set of instructions to perform cache management; the set of instructions, when carried out by computerized circuitry, causing the computerized circuitry to perform a method of:
determining respective elimination scores of a plurality of entries in a cache based at least in part on compression rates of data blocks corresponding to the plurality of entries, wherein lower compression rates indicate higher degrees of data compression, the elimination score being proportional to the compression rate; and
removing, from the cache, at least one entry with a relatively low elimination score among the plurality of entries.

\* \* \* \* \*